March 30, 1971     C. S. VINTON ET AL     3,573,130

METHOD OF BONDING POLYMER-COATED FIBERS BY SOLVENT ACTION

Filed Oct. 10, 1968     2 Sheets-Sheet 1

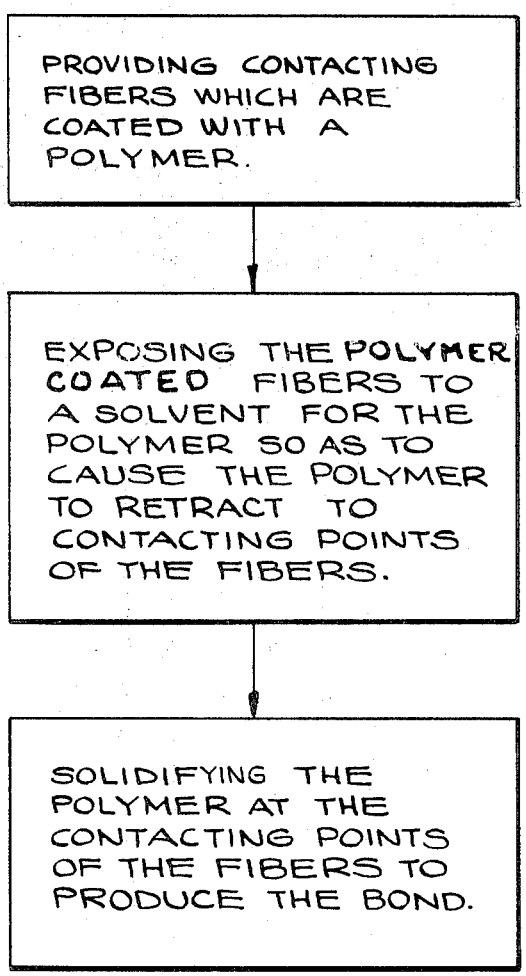

FIG. 1

STEP 1: PROVIDING CONTACTING FIBERS WHICH ARE COATED WITH A POLYMER.

STEP 2: EXPOSING THE POLYMER COATED FIBERS TO A SOLVENT FOR THE POLYMER SO AS TO CAUSE THE POLYMER TO RETRACT TO CONTACTING POINTS OF THE FIBERS.

STEP 3: SOLIDIFYING THE POLYMER AT THE CONTACTING POINTS OF THE FIBERS TO PRODUCE THE BOND.

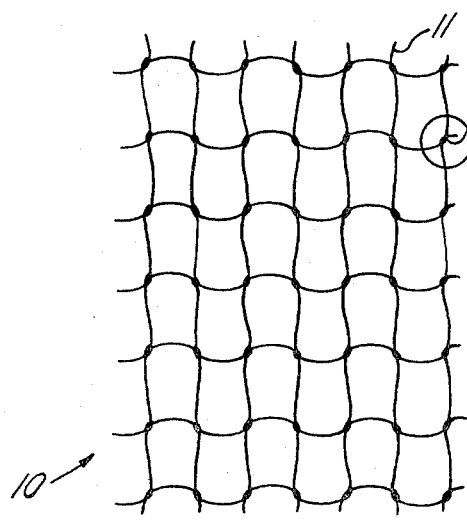

FIG. 2

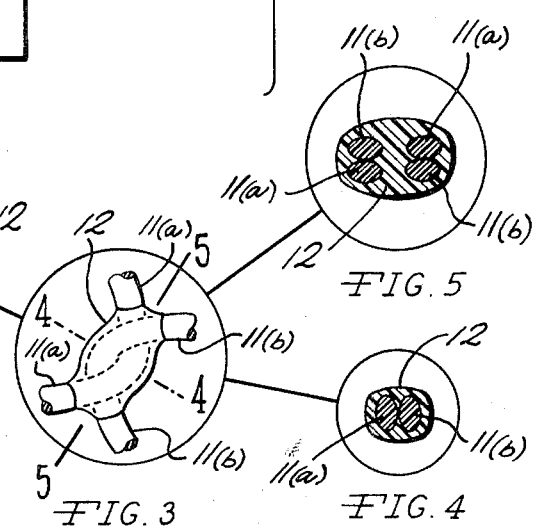

FIG. 3    FIG. 4    FIG. 5

INVENTORS
CLARENCE S. VINTON
GEORGE B. MORAVEK

BY *Miller Morris Pappas & McLeod*

ATTORNEYS

March 30, 1971  C. S. VINTON ET AL  3,573,130
METHOD OF BONDING POLYMER-COATED FIBERS BY SOLVENT ACTION
Filed Oct. 10, 1968  2 Sheets-Sheet 2
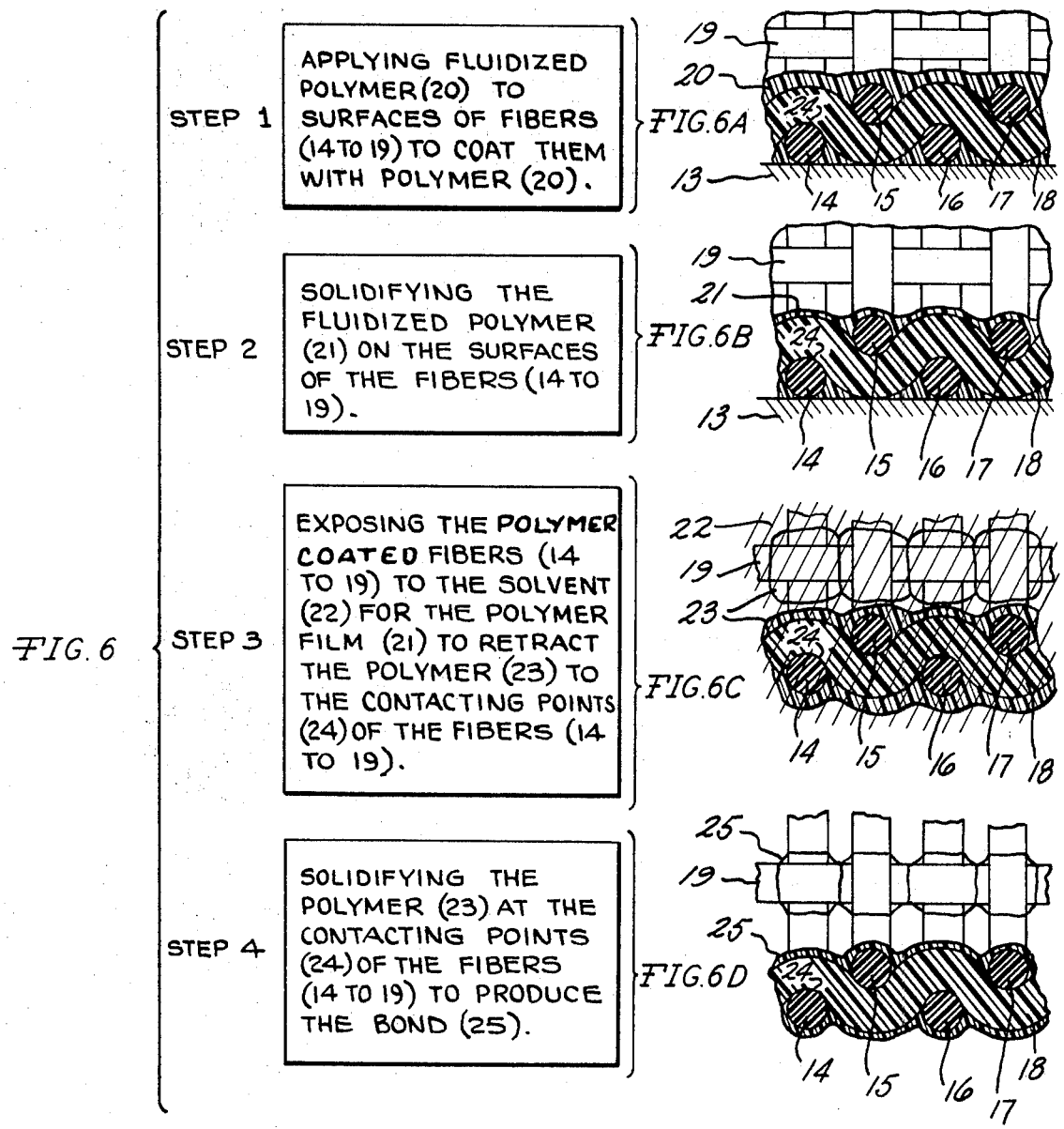
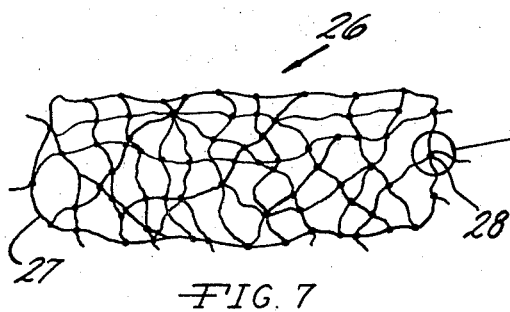
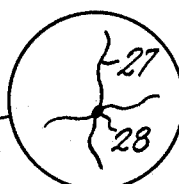
INVENTORS
CLARENCE S. VINTON
GEORGE B. MORAVEK
BY
ATTORNEYS

United States Patent Office 3,573,130
Patented Mar. 30, 1971

3,573,130
METHOD OF BONDING POLYMER-COATED FIBERS BY SOLVENT ACTION
Clarence S. Vinton and George B. Moravek, Ann Arbor, Mich., assignors to Chemotronics, Incorporated, Ann Arbor, Mich.
Filed Oct. 10, 1968, Ser. No. 766,457
Int. Cl. C09j 5/00
U.S. Cl. 156—305                    17 Claims

ABSTRACT OF THE DISCLOSURE

A method for the bonding of fibers by providing a bonding agent at the point of contact of the fibers is described. An essential feature of the method is exposing contacting fibers, which may be monofilamentary or multifilamentary, and which have been coated with a film of a polymer which is solidified sufficiently to resist fluid flow of the polymer on the fibers, to a solvent for the polymer film, preferably in vapor form for ease of control of the process, which then retracts to the points of contact between the fibers because of the action of the solvent. Particularly preferred in the method is the use of elastomeric polymers for bonding and the products obtained thereby. The fibers can be in the form of knitted, woven and non-woven or needle punched batt or mat fabrics. The bonded products are useful in the same general areas where unbonded products are used. Particularly useful are the described bonded knitted nylon stockings.

SUMMARY OF INVENTION

The present invention relates to a method for the bonding of the points of contact of fibers using polymeric bonding agents. In particular the present invention relates to the use of elastomeric polymers as the bonding agents and the novel products obtained thereby.

PRIOR ART

Numerous methods of fiber bonding are known to and described by the prior art wherein the bonds are achieved using self-bonding of the fibers or bonding agents at the points of fiber contact. Such methods are described for instance in U.S. Pat. Nos. 2,734,841; 2,811,029; 2,978,-785; 3,102,835; 3,271,220 and 3,365,354. In self-bonding of the fibers at the contact points, various means are used to fuse the contacting fibers together such as by heat and/or chemical means which softens or liquifies the fibers at the points of contact, as represented by U.S. Pat. Nos. 3,271,220 and 3,365,354. In the use of polymeric bonding agents at the fiber contact points the general method includes coating the fibers with a fluidized polymer and then solidifying the polymer such as by heating as represented by U.S. Pat. Nos. 2,734,841; 2,811,029; 2,978,785 and 3,102,835. In these instances, much of the fluidized polymeric bonding agent collects at the fiber contact points, but a large amount still remains coated on the fibers between the contact points contributing to increased product cost, stiffness and density. The self-bonded fiber processes have the advantage of lower density, but the bonds are more rigid and the bonded fabrics produced thereby are less desirable in certain end uses such as in knitted nylon stockings.

The optimum balance of properties would be achieved if a method of bonding could be achieved which provided a predetermined amount of polymeric bonding agent at the fiber contact points without substantially coating the balance of the fibers between the contact points. Further, for many end uses it would be best if the bonding agent was an elastomeric polymer, rather than the non-elastomers used by the prior art.

It is therefore an object of the present invention to provide a method of bonding which provides a predetermined amount of polymeric bonding agent at the fiber contact points without substantially coating the balance of the fibers between the contact points. Further it is an object of the present invention to provide a method whereby reproducible results can be achieved with ease and economy of operation. Further still it is an object of the present invention to provide novel products wherein the fiber contact points are bonded together with an elastomeric polymer which allows these bonded contact points to be elastically stretched without rupture of the bond. These and other objects will become increasingly apparent by reference to the following description and the drawings.

In the drawings:

FIG. 1 schematically illustrates in Steps 1, 2 and 3 the method of the present invention in its broadest aspects wherein the fiber contact points are bonded together.

FIG. 2 is a plan view of monofilament knitted nylon stocking fabric illustrating the fiber crossover points in the knit bonded with an elastomeric polymer.

FIG. 3 is an exploded plan view of an individual fiber bond as shown in FIG. 2 illustrating in detail the retracted polymeric bonding agent.

FIG. 4 is a cross-sectional view along line 4—4 of FIG. 3 of the fibers and polymeric bond at the fiber point of contact, illustrating the distribution of the polymer at the point of contact in this plane.

FIG. 5 is a cross-sectional view along line 5—5 of FIG. 3 of the fibers and polymeric bond at the fiber contact points illustrating the distribution of the polymer in this plane.

FIG. 6 schematically illustrates a preferred method of the present invention in Steps 1, 2, 3 and 4, wherein the fiber contact points are bonded together and particularly showing in FIGS. 6A, 6B, 6C and 6D, the operation of the method as applied to a multifiament fiber woven fabric.

FIG. 7 is a front cross-sectional view of a monofilament fibrous matt or batt of fibers wherein the fibers are bonded together with a polymeric bonding agent.

FIG. 8 is an exploded view of a point of contact of fibers as shown in FIG. 7 bonded with a polymer.

GENERAL DESCRIPTION

The present invention generally relates to the method for the bonding of monofilamentary or multifilamentary fibers which comprises: (a) providing contacting fibers which are coated with a polymer which is solidified sufficiently to resist fluid flow of the polymer on the fibers; (b) exposing the contacting polymer coated fibers to a solvent for the polymer coating which is a non-solvent for the fibers so as to cause the polymer coating on the fibers to retract to the contacting points of the fibers because of the action of the solvent on the polymer coating; and (c) solidifying the polymer at the contacting points of the fibers to produce the bond. The polymer can be coated on the fibers using a solvent solution, or in the molten state, or as a powder or can be polymerized directly on the fiber from the gaseous or liquid state in treatment by the method of the present invention. Further the present invention relates to the novel article of manufacture with bonded fiber contact points which comprises: (a) contacting fibers; and (b) at least some of the points of contact of the fibers being bonded together with an elastomeric polymer which allows the bonds to be elastically stretched. The products of the method of the present invention are substantially free of polymer between the contact points of the fibers.

Fibers which can be bonded by the method of the present invention can be of animal, vegetable, mineral and synthetic origin. The fiber diameter and length are not critical for the purposes of the present invention. The fibers can be monofilament or multifilament. Thus vegetable fibers such as cotton, hemp, jute, ramie, sisal, cellulose, excelsior, abaca, and the like can be used. Animal fibers include wool, silk, hair from cattle, horses and hogs and the like. Mineral fibers include metals, asbestos, glass, graphite, ceramics and the like. Synthetic fibers include nylon, cellulose acetate, viscose rayon, vinyl chloride, polyester and the like.

The fibers are fabricated for use in the method of the present invention by conventional means and include various fabrics such as non-woven batts or mats, with or without needle punching, woven articles and knitted articles. The only important feature of such fabrics is that the fibers intersect or overlay each other and are in contact.

Referring to Step 1, of FIG. 1, contacting fibers are provided which are coated with a film of polymer. This film generally weighs about five percent (5%) to fifty (50%) of the fabric weight and preferably between about twenty percent (20%) to forty percent (40%). The coating is uniformly deposited on and/or within the fabric such that the fibers are coated. The fibers can be coated prior to forming the fabric, such as by sizing the fibers with a polymer, or the polymer can be applied after the fabric is formed. The polymer material is in any event sufficiently solidified upon completion of Step 1 that it resists fluid flow on the surfaces of the fibers. It has been unexpectedly found that the subsequent Steps 2 and 3 of the process cannot be successfully completed unless the polymer has been so solidified.

Referring to Step 2 of FIG. 1, the polymer film coated contacting fibers are exposed to a solvent for the polymer which is a non-solvent for the fibers, while such fibers are maintained in contact so as to cause the polymer film to retract to the contact points of the fibers because of the action of the solvent on the polymer film. The treatment is continued until the polymeric film retracts to the fiber contacting points of the particular fabric being treated. It has been found when solvent vapor treatment of the polymer coated fabric is used, that the length of time necessary to retract the polymer to the fiber contacting points is in part dependent upon the concentration of the solvent vapor in the chamber, that is, where the vapor concentration is high, less time is generally needed. The solvent vapor concentration is easily regulated by controlling the temperature and, when a sealed system is used, the pressure. Thus the solvent vapor concentration can be increased by reducing the pressure below atmospheric in a sealed system or by heating the solvent in an open or sealed system or by both means.

In Step 3 of FIG. 1, the polymer is then solidified at the fiber contact points. This can usually be accomplished using conventional drying means such as heated air or vacuum.

FIGS. 2 to 5 illustrate the product of the method of the present invention wherein the fabric 10 is knitted, such as monofilament fiber knitted nylon stockings. The fibers 11 are bonded together at the contacting points of the fibers 11 with a polymer 12, preferably an elastomeric polymer. Thus as shown in FIGS. 3 to 5, the polymer 12 bonds the crossover point of the fibers 11(a) and 11(b) so that the crossover point is encapsulated. Where the polymer 12 is an elastomer, the bonded crossover points can be elastically stretched, which is an advantage with fabrics such as nylon stockings, and yet are virtually completely resistant to running or unraveling as with conventional knitted fabrics.

The polymer material for the bonding is preferably an elastomer such as the elastomeric urethanes, including the polyalkylene ether or ester urethanes; polyalkylene polymers and copolymers including the copolymers of proyplene and ethylene; natural rubber; latex; poly 2-chlorobutadiene 1,3 and chlorosulfonated polyethylene have been used in the novel products of the present invention. Non-elastomers, such as methylmethacrylate and vinyl acetate can be used in the method of the present invention but are not generally preferred.

Having generally described the method and novel elastomeric polymer bonded fiber articles of the present invention the following is a specific description.

SPECIFIC DESCRIPTION

Referring to Step 1 of FIG. 6 and FIG. 6A, a fluidized polymer 20 is applied to the surfaces of fibers 14 to 19 in the form of a woven fabric so that the fibers are coated with a film of polymer 20. The polymer 20 is preferably dissolved in a solvent in order to fluidize the polymer or alternatively it can be melted by heating or dispersed in a liquid, depending upon the particular polymer 20 used. As particularly shown in FIG. 6A, the fluidized polymer 20 is applied directly to the woven fabric supported by a plate 13 which is repellent to permanent bonding with the polymer 20 to regulate the thickness of the film, however the fibers 14 to 19 can be coated with the polymer 20 prior to the weaving of the fibers 14 to 19.

Referring to Step 2 of FIG. 6 and FIG. 6B, the fluidized polymer 20 on the fabric is solidified on the surfaces of the fibers 14 to 19 sufficiently to resist fluid flow to form the solidified polymer 21. As shown in FIG. 6B, the solidified polymer 21 is distributed throughout the fabric, including the fiber surfaces 14 to 19 between the fiber contacting points 24. The fibers 14 to 19 and solidified polymer 21 are then removed from the plate 13.

Referring to Step 3 of FIG. 6 and FIG. 6C, the solidified polymer 21 on the coated fibers 14 to 19 of the fabric is exposed to a solvent 22 for the polymer film 21 to retract the solventized polymer 23 to the contacting intersections 24 of the fibers 14 to 19. The solvent 22 for the polymer 21 is a non-solvent for the fibers 14 to 19 as discussed above. As shown in FIG. 6C the fibers 14 to 19 between the intersections are substantially free from the solventized polymer 23.

Referring to Step 4 of FIG. 6 and FIG. 6D, the intersection bond 25 is produced by resolidifying the solventized polymer 23 at the intersections of the fibers 14 to 19. This is most easily accomplished using conventional drying techniques to remove residual amounts of solvent 22 in the bond 25.

Referring to FIGS. 7 and 8 another article of manufacture is illustrated which is a fabric of fibers 27 in the form of a non-woven batt or mat 26 which are bonded at the intersections with a polymer 28. In this instance the fibers 27 form a three dimensional structure of the batt or mat 26.

The following Examples I to XIV illustrate the method of the present invention.

Example I

In this example, knitted nylon stocking fabric made of monofilament fibers (approximately 0.0015 inch fiber diameter and about 1/64 inch between crossover points) was to be bonded at the intersections. Such fabric was easily obtained from nylon stocking fabric which was carefully cleaned by submerging the fabric in an aqueous solution containing five percent (5%) chlorinated solvent and ten percent (10%) alkylphenoxypolyethanol for 30 minutes at 150° F. to remove any sizing or lubricant on the fibers.

The knitted nylon fabric, measuring ten inches (10") by ten inches (10") was carefully stretched onto a flat piece of glass and fixed in this position using tape around the circumference of the fabric or any other suitable means for attaching the edges of the fabric to the glass sheet. A solution of dimethyl formamide containing five percent (5%) by weight a polyalkyleneether urethane (Estane$_{T.M.}$ B. F. Goodrich Company, New York as disclosed in United States Patent No. 3,000,757) was uniformly coated onto the fabric and glass. The coating weight of the urethane, based on dry polymer weight, was forty percent (40%) of the weight of the fabric.

The fluidized coating was then solidified by drying in an oven at 75° C. for one and one-half (1½) hours. The fabric with solidified coating adhering thereto was then peeled from the glass plate after soaking in water to loosen the fabric-plus-coating from the glass plate.

The knitted nylon fabric with the solified polymer film was placed on conventional eight inch (8") embroidery hoops for convenience of handling and then placed in a sealable chamber containing a solution of dimethyl formamide in a container so that vapors from this solvent were able to contact the polymer film. The chamber was then sealed and air was evacuated to 600 mm. of mercury which caused the vapors of the solvent to permeate the polymer film on the fabric. This treatment was continued for two (2) hours. Upon completion of this treatment the fabric with the polymer retracted was removed from the chamber and dried at 75° C. for one (1) hour.

It was found that the polymer film had completely retracted to the crossover points of the knitted nylon fabric as shown in FIGS. 2 to 5. The bonded intersections could be elastically stretched at the crossover points. Further the nylon fabric was found to be completely runproof; by placing the fabric with a cut in the center over the mouth of a conventional drinking glass and pulling the fabric down and away from the mouth of the glass, and tore only with considerable difficulty. The control sample without the elastomeric polymer at the intersections easily ran. Using a conventional puncture, run and burst test the fiber intersection bonded fabric was found to have somewhat greater perforation strength and total immunity to running while the burst strength was the same as the control. The test involved measuring the pressures required to puncture the fabric with an ascending knife followed by an ascending ring with a smooth edge which continues to ascend to burst the fabric, each of which affects a pressure measuring (resistance measuring) direct reading device so that the relative puncture, run resistance and burst characteristics of the fabric can be objectively measured.

The procedure of Example I was repeated varying certain of the conditions of the method. The results are shown in the following Table I.

TABLE I

| Example Number | Starting fabric | | | Step 1 | |
|---|---|---|---|---|---|
| | Fabric | Fiber | Fluidized polymer | Percent by weight, (polymer in solvent) | Percent by weight polymer of fabric weight |
| I | Knitted | Monofilament nylon | Polyalkyleneether urethane [2] | 5, (DMF) | 40 |
| II | Woven [3] | Multifilament cotton | do | 5, (DMF) | 40 |
| III | Knitted | Monofilament nylon | Propylene ethylene copolymer [4] | 1, (Xylol or toluol) | 30 |
| IV | do | do | Chlorosulfonated polyethylene [5] | do | 30 |
| V | do | do | Poly 2-chlorobutadiene 1, 3 [6] | do | 30 |
| VI | do | do | Methylmethacrylate [7] | 1, (Methylethyl ketone) | 30 |
| VII | do | do | Vinyl acetate | do | 30 |
| VIII | do | do | Natural rubber latex emulsion | 68, (Water) | 30 |
| IX | do | do | Polyalkyleneether urethane [8] | 5, (DMF) | 50 |
| X | do | do | do | 2.5, (DMF) | 50 |
| XI | do | do | do | 1.5, (DMF) | 50 |
| XII | do | do | do | 5, (DMF) | 50 |

| Example Number | Step 2 | | Step 3 | | Step 4 | |
|---|---|---|---|---|---|---|
| | Drying temperature, °C. | Drying time (hours) | Vapor solvent | Vacuum pressure (mm. Hg) | Exposure time (hours) | Drying time (hours) | Drying temperature, °C. |
| I | 75 | 1½ | DMF [1] | 600 | 2 | 1 | 75 |
| II | 75 | 1½ | DMF [1] | 600 | 2 | 1 | 75 |
| III | 75 | 1½ | Xylol or toluol | 600 | 2 | 1 | 75 |
| IV | 75 | 1½ | Xylol or toluol | 600 | 2 | 1 | 75 |
| V | 75 | 1½ | Xylol or toluol | 600 | 2 | 1 | 75 |
| VI | 75 | 1½ | Methylethyl ketone | 600 | 2 | 1 | 75 |
| VII | 75 | 1½ | do | 600 | 2 | 1 | 75 |
| VIII | 75 | 1½ | DMF vapors [1] | 600 | 2 | 1 | 75 |
| IX | 75 | 1½ | do | 300 | 2 | 1 | 75 |
| X | 75 | 1½ | do | 300 | 2 | 1 | 75 |
| XI | 75 | 1½ | do | 300 | 2 | 1 | 75 |
| XII | 75 | 1½ | do | 400 | 2 | 1 | 75 |

[1] Dimethyl formamide
[2] Trademark—Estane.
[3] Cheesecloth.
[4] Trademark—Nordel.
[5] Trademark—Hypalon.
[6] Trademark—Neoprene.
[7] Trademark—Plexiglas.
[8] Trademark—Estane.

The polymer film can also be applied to the fibers in heated molten form with subsequent cooling at a temperature less than that which adversely affects the fibers and/or at various temperatures in a solventized form where the solvent is a non-solvent for the fibers with the subsequent removal of at least some, and preferably substanally all, of the solvent prior to forming the fabric and then treated by the method of the present invention. The following Example XIII illustrates this embodiment of the present invention.

Example XIII

Monofilament nylon fibers (about 0.012 inch in diameter) were coated with the polymeric material used in Example I (60% polymer in dimethyl formamide) by dipping the fibers into the solution and then removing the excess polymer solution by drawing the dipped fiber through a fixed diameter (0.020") orifice to leave a uniform coating of polymer solution on the fibers, after which they were allowed to dry to solidify the polymer. The fibers were then woven such that there was one-eighth inch (⅛") between the crossover points.

The woven fabric was then exposed for one (1) hour to dimethyl foramide vapors in an unsealed container maintained at 100° C., after which it was dried. It was found that the fiber intersections were firmly bonded and that the bonded intersections could be elastically stretched.

The solvent treatment can be liquid; however, this is not preferred since it is difficult to control because the liquid solvent tends to remove polymer from the fiber contact points. Illustrative of the use of liquid solvent is the following Example XIV.

Example XIV

The procedure of Example I was repeated, except that the solvent was used as a liquid, which was contacted with the polymer coated knitted nylon by spreading a liquid solvent coating on a glass plate and transferring the coating to the fabric by momentarily pressing the fabric against the liquid coated plate after which the fabric was dried. Liquid solvent treatment in this manner provided some manner of control. It was found that the polymer retracted to the fiber intersections.

As previously stated, it is preferred to use between about twenty percent (20%) to forty percent (40%) by weight dry polymer based upon the dry fabric weight. It has been found that this provides an adequate amount of polymer for bonding without an excess which would tend to leave the fibers between the points of fiber contact coated after treatment by the method of the present invention. Where the polymer-solvent solution is to be coated onto the fabric, it is preferred to use a solution containing between about one-half percent (½%) to fifteen percent (15%) by weight polymer in the solvent to insure uniform distribution of the polymer over the fabric as in Examples I to XII. Where the polymer is coated on the fibers before they are formed into a fabric, it is preferred to use higher concentrations of polymer in the solvent, as in Example XIII or no solvent at all depending upon whether or not the polymer is sufficiently fluid to obtain a uniform coating of the fibers.

The solidified polymer is then exposed to solvent preferably solvent vapor. In some cases it is preferred to conduct this step as a vapor treatment at reduced pressures and at ambient temperatures in a sealed system for a period of up to about four (4) hours to insure that the polymeric bonding agent retracts to the fiber intersections, although longer or shorter treatment times can be used depending upon the particular solvent and polymeric bonding agent used. Elevated temperatures can also be used at reduced, ambient or elevated pressures. In any event, the solvent vapor treatment time can be varied between wide limits since the treatment is essentially self-limiting and stops once the polymeric bonding agent has retracted to the fiber contacting points. This is an advantage over liquid solvent treatment.

In the final step the polymeric bonding agent is solidified. This usually involves heated air and/or vacuum drying. Where desired the polymeric material can be treated by either vapor or liquid phase treatment with an additional material which catalizes or combines or initiates a reaction with or in the polymeric material to obtain solidification, as is known in the prior art.

It is intended that the foregoing description be only illustrative of the present invention and that this invention be limited only by the hereinafter appended claims.

We claim:
1. The method for the bonding of fibers which comprises:
  (a) applying a fluidized polymer to the surfaces of fibers such that the surfaces of fibers are coated with the polymer;
  (b) solidifying the fluidized polymer on the surfaces of the fibers sufficiently to resist fluid flow of the polymer on the surfaces of the fibers.
  (c) exposing the solidified polymer coated fibers to a solvent for the polymer which is a non-solvent for the fibers, while such fibers are maintained in contact, so as to cause the polymer coating on the fibers so exposed to retract to the points of contact of the fibers because of the action of the solvent on the solidified polymer film; and
  (d) resolidifying the polymer at the contacting points of the fibers to produce the intersection bond.

2. The method of claim 1 wherein the polymer coated fibers are exposed to the solvent in the vapor phase.

3. The method of claim 1 wherein the polymer is fluidized for application in step (a) by providing the polymer in heated molten form at a temperature less than that which adversely affects the fibers and wherein the polymer is solidified in step (b) by cooling the polymer.

4. The method of claim 1 wherein the polymer is fluidized for appliication in step (a) by providing a solution of the polymer in a solvent for the polymer which is a non-solvent for the fibers and wherein the polymer is solidified in step (b) by removal of at least some of the solvent from the polymer.

5. The method of claim 4 wherein the polymer is an elastomeric polyalkyleneether urethane.

6. The method of claim 4 wherein the solvent-polymer solution contains between about one-half percent (½%) to sixty percent (60%) by weight polymer.

7. The method of claim 4 wherein the solvent is substantially removed in solidifying the polymer in step (b).

8. The method of claim 1 wherein the polymer is fluidized for application in step (a) by providing a solution of the polymer in a solvent for the polymer which is a non-solvent for the fibers, wherein the polymer is solidified in step (b) by the removal of at least some of the solvent from the polymer and wherein the solidified polymer is retracted in step (c) by the vapors of the same solvent used in step (a).

9. The method of claim 8 wherein the solvent is dimethyl formamide and wherein the polymer is an elastomeric polyalkyleneether urethane.

10. The method of claim 1 wherein the polymer is applied to the fibers in step (a) by providing contacting fibers on a surface repellent to permanent bonding with the polymer and then applying the fluidized polymer to the fibers so that the fibers are coated with the polymer.

11. The method of claim 10 wherein the surface is glass.

12. The method of cliam 10 wherein the fibers are in the form of knitted fibers.

13. The method of claim 12 wherein the fibers are nylon.

14. The method of claim 1 wherein the polymer is applied to the fibers in step (a) by coating the fiber with the polymer prior to forming the fabric.

15. The method of claim 1 wherein the film on the solidified polymer coated fibers is exposed to vapors of the solvent in step (c) by providing the intersecting and contacting polymer coated fibers in a closed chamber above the solvent and then reducing the pressure in the chamber at ambient temperatures to retract the polymer to the points of contact of the fibers by exposure to the solvent vapors.

16. The method of claim 1 wherein the dry polymer weight is between about five percent (5%) and fifty (50%) of the dry fiber weight.

17. The method for the bonding of fibers which comprises:
  (a) providing contacting fibers which are coated with a polymer which is solidified sufficiently to resist fluid flow of the polymer on the fibers,
  (b) exposing the intersecting and contacting polymer film coated fibers to a solvent for the polymer coating which is a non-solvent for the fibers so as to cause the polymer coating on the fibers to retract to the contacting points of the fibers because of the action of the solvent on the polymer coating; and
  (c) solidifying the polymer at the contacting points of the fibers to produce the bond.

References Cited
UNITED STATES PATENTS
2,380,003   7/1945   Whitehead _____ 8—131

LELAND A. SEBASTIAN, Primary Examiner

R. L. TATE, Assistant Examiner

U.S. Cl. X.R.

156—166; 161—89